No. 645,522. Patented Mar. 13, 1900.
T. G. CLIFFORD.
TOBACCO PIPE.
(Application filed Dec. 20, 1899.)

(No Model.)

Witnesses:
J. H. Shumway
Lillian D. Kelsey

Thomas G. Clifford, Inventor
By attys. Seymour & Earle

UNITED STATES PATENT OFFICE.

THOMAS G. CLIFFORD, OF HOBOKEN, NEW JERSEY, ASSIGNOR OF ONE-HALF TO JOHN H. REPPER AND MARTIN MAGER, JR., OF MIDDLE VILLAGE, NEW YORK.

TOBACCO-PIPE.

SPECIFICATION forming part of Letters Patent No. 645,522, dated March 13, 1900.

Application filed December 20, 1899. Serial No. 740,966. (No model.)

*To all whom it may concern:*

Be it known that I, THOMAS G. CLIFFORD, of Hoboken, in the county of Hudson and State of New Jersey, have invented a new Improvement in Tobacco-Pipes; and I do hereby declare the following, when taken in connection with the accompanying drawings and the letters of reference marked thereon, to be a full, clear, and exact description of the same, and which said drawings constitute part of this specification, and represent, in—

Figure 1:
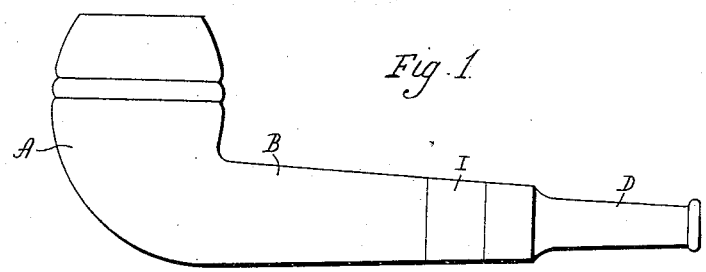
Figure 2:
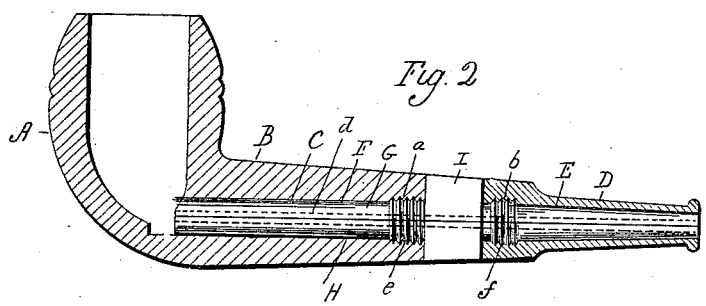
Figure 3:
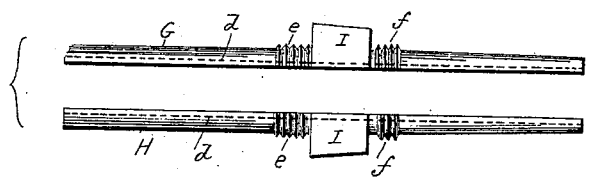

Figure 1, a side view of a tobacco-pipe constructed in accordance with my invention; Fig. 2, a longitudinal sectional view of the same; Fig. 3, a plan or side view of the internal tubes, showing the members slightly separated.

This invention relates to an improvement in tobacco-pipes, and particularly to that class in which the mouthpiece is detachable from the stem, and more especially to that class in which the auxiliary tube is arranged in the stem to facilitate cleaning, the object of the invention being a simple construction whereby the internal tube in the stem shall be properly and positively located with respect to the stem and mouthpiece; and it consists in the construction as hereinafter described, and particularly recited in the claim.

As herein shown, the bowl A of the pipe is provided with a stem B in substantially the usual manner and of any desired design. Through the stem and opening into the bowl is a passage C, as usual with pipes of this character, except that the opening is somewhat larger. The outer end of the stem is formed with internal threads $a$. The mouthpiece D may also be of any desired material and design and is formed with a longitudinal passage E, as in the usual construction, except that, like the stem B, the opening is larger than usual, and the inner end of the mouthpiece is also formed with internal threads $b$. The mouthpiece and stem are connected by a tube F, which is longitudinally divided, forming two members G H, one or both of which is formed with a longitudinal groove $d$. Projecting from the members G H are shoulders I, the projection of which corresponds to the thickness of the adjacent ends of the stem and mouthpiece. On opposite sides of these shoulders the stems are formed with threads $e$ $f$, and the length of the members on opposite sides of the shoulders corresponds, respectively, to the length of the stem and mouthpiece, and the external diameter of the united members corresponds closely to the diameters of the passages through the stem and mouthpiece. The members of the tube F are placed together, so as to form a longitudinal opening and are inserted into the stem of the pipe and the threads $e$ engaged with the threads $a$, so as to bring the end of the stem to a bearing against the shoulders I, and the mouthpiece is then placed over the outer ends of the tubes and the threads $b$ engaged with the threads $f$, so as to draw the inner end of the mouthpiece to a bearing against the opposite faces of the shoulders $i$. With the shoulders thus formed a fixed bearing is provided for the inner end of the stem and mouthpiece, so that they are fixed with relation to the ends of the inner tube, and the sections of the tube are held in proper relation to each other without interlocking means. The outer faces of the shoulders I correspond to the external shape of the stem and practically form a continuation thereof and if made from different material than the stem form an ornamental band.

I am aware that internal split tubes have been arranged in the stems of pipes, and therefore do not wish to be understood as claiming, broadly, such as my invenvention; but, Having fully described my invention, what I claim as new, and desire to secure by Letters Patent, is—

The combination, in a tobacco-pipe comprising a bowl and a stem and an independently-formed mouthpiece, said stem and mouthpiece provided with longitudinal passages, and each internally threaded at its end, of a longitudinally-split tube adapted to enter the passages in the stem and mouthpiece, and formed with shoulders against which the inner ends of the stem and mouthpiece abut, and also formed with external threads on opposite sides of said shoulders with which the threads in the stem and mouthpiece engage, whereby the stem and mouthpiece are connected and the members of the tube clamped together, substantially as described.

In testimony whereof I have signed this specification in the presence of two subscribing witnesses.

THOMAS G. CLIFFORD.

Witnesses:
WILLIAM H. WHITE,
WILLIAM WILKINS.